Patented Oct. 13, 1953

2,655,484

UNITED STATES PATENT OFFICE 2,655,484

REFORTIFICATION OF ALUMINUM HALIDE-HYDROCARBON COMPLEX CATALYST

John L. Groebe, Dewey, Okla., assignor to Phillips Petroleum Company, a corporation of Delaware Application January 4, 1950, Serial No. 136,821

4 Claims. (Cl. 252—411)

This invention relates to an improved apparatus and methods for refortifying Friedel-Crafts-type hydrocarbon complex catalysts. In one of its more specific aspects this invention relates to improvements in apparatus for suspending aluminum halide in hydrocarbon feed streams which are not reactive with the suspended aluminum halide.

Aluminum halide-hydrocarbon complex catalysts are widely used in commercial processes for the conversion of hydrocarbons. Isomerization and alkylation are typical examples of hydrocarbon conversion reactions wherein such catalysts are employed commercially.

These catalysts are usually prepared by agitating kerosene, a high boiling alkylate fraction, or other hydrocarbon mixtures of suitable boiling range with aluminum halide. This results in the formation of two liquid phases, a heavy lower phase containing the aluminum halide in a hydrocarbon complex of unknown structure and an upper phase composed of supernatant hydrocarbons. The upper phase is then drawn off and further amounts of aluminum halide are dissolved and/or suspended in the complex. This fortification of the catalyst is continued until the desired degree of catalytic activity is reached. The catalyst is then ready for use.

Any of the aluminum halides may be used to form such complex catalysts, but the cost of aluminum iodide is prohibitive. Aluminum bromide is also expensive but finds some use in processes where solubility of the halide in hydrocarbons is required. Aluminum chloride is the halide of aluminum used in most commercial processes because of its cheapness and availability in anhydrous granular form. This invention is especially effective when applied to the use of granular anhydrous aluminum chloride.

In use catalysts prepared as described above gradually lose their activity and must be refortified by further additions of aluminum halide. The usual methods for refortifying these catalysts include the steps of pumping a portion of the catalyst from the reaction zone under considerable pressure, depressuring to approximately atmospheric pressure, adding aluminum halide, suspending or dissolving the added halide in the catalyst and pumping the catalyst back to the reaction zone.

The use of these steps with aluminum chloride-hydrocarbon complex catalysts possesses many disadvantages. The catalyst as it comes from the reaction zone usually contains considerable quantities of low-boiling hydrocarbons and by decreasing the pressure to that of the atmosphere these valuable hydrocarbons are vaporized and lost. As these hydrocarbons vaporize, the temperature of the catalyst is reduced and it becomes more viscous, making it necessary to heat the catalyst so that it can be pumped more easily. Aluminum chloride is added in finely ground form and is usually mixed with a propeller type mixer or similar means to form a slurry with the catalyst. This slurry is then returned to the catalyst zone, usually by means of pumps of the positive displacement type equipped with oil flush. The solids in the slurry cause many difficulties in pumping operations and the oil flush systems do not completely prevent erosion and clogging due to suspended halid. As a result the refortification system must be shut down frequently to repair pumps. Check valves are often plugged and the operator must strike them with a hammer in order to free them; a very dangerous practice since "Hastalloy" or other brittle corrosion resistant material is usually used in the piping and piping failure allows the catalyst to escape at pressure of the order of 400 p. s. i. It is common for a refortification system to be shut down for about 50 per cent of the time to repair pumps and check valves. This causes irregular refortification of the catalyst, or requires duplication of apparatus with ensuing increased costs.

A method and apparatus for accomplishing refortification of aluminum chloride-hydrocarbon complex catalyst without the disadvantages mentioned above, is greatly desired. Chenicek, in U. S. Patent 2,360,547, disclosed the fortification of an aluminum chloride catalyst in the reaction zone by introducing aluminum chloride in solution in a feed stream composed essentially of isobutane and n-butane. This is accomplished by passing the feed upwardly through a pickup chamber containing granular aluminum chloride under conditions of temperature, pressure and fluid flow adjusted to dissolve the required quantity aluminum chloride. This method of operation also has its disadvantages which prevent its application to all conditions. It is frequently highly undesirable to introduce the feed into the reaction zone under conditions necessary for the solution of the required amount of aluminum chloride. At temperatures of not more than 100° F. it has been found that quantities of aluminum chloride sufficient for catalyst refortification cannot be dissolved in an isobutane feed stream, and it is often undesirable to pass the entire feed stream through a pickup chamber. It has also been observed in pilot plant work that it is impractical to pass an isobutane feed stream at temperatures of not more than 100° F. upwardly through a simple pickup chamber containing aluminum chloride, since under these conditions bridging and plugging occurs in the chamber until all fluid flow is stopped.

U. S. Patent 2,421,326 of which I am coinventor discloses one method of suspending aluminum halide in a hydrocarbon feed and refortifying an aluminum halide-hydrocarbon complex therewith. In this patent it is disclosed to pass isobutane through a chamber containing granular aluminum halide in an upward direction thus picking up a portion of the aluminum halide and carrying it in suspension to the catalyst to be refortified. In this mode of operation only so much aluminum halide is suspended as can be immediately removed by the suspending liquid through a withdrawal line above and on the opposite side of the chamber from the inlet line for hydrocarbon. When the portion of catalyst above one inlet is withdrawn a hydrocarbon inlet lower down is used and so on until the chamber is empty.

It is an object of this invention to provide an improved method and apparatus for refortifying aluminum halide-hydrocarbon complex liquid catalysts.

Another object is to provide an improved method and apparatus for accomplishing such refortification without depressurizing the catalyst and without passing aluminum chloride slurry through pumps.

Still another object of this invention is to provide a method and apparatus for accomplishing refortification of aluminum halide-hydrocarbon complex wherein a minimum of moving apparatus is used which will contact the complex.

Another object of this invention is to provide an apparatus for suspending aluminum chloride in liquid hydrocarbons which are not reactive therewith.

Another object is to provide a method for passing a uniform suspension of aluminum halide to aluminium halide-hydrocarbon complex refortification.

Other objects and advantages of this invention will be apparent to those skilled in the art from the accompanying discussion and disclosure.

I have discovered an improved method and apparatus for suspending aluminum chloride in a hydrocarbon and passing same in a uniform suspension to a catalyst zone wherein an aluminum halide-hydrocarbon complex catalyst is being utilized. One embodiment of my invention comprises the use of an axially positioned perforate conduit placed in an aluminum halide storage tank, which conduit contains circumferentially and longitudinally spaced perforations through which a suspension of aluminum halide in a non-reactive hydrocarbon is withdrawn. To provide this suspension of aluminum halide, circular headers are horizontally positioned along the length of the chamber for the introduction of hydrocarbon thereto. It is of particular advantage to place nozzles on the feed headers in such a position that they point either upward or downward rather than horizontally and other than in the same vertical plane with the header radii passing through the bases thereof. It is generally preferred that the nozzles be at an angle of about 45° with the vertical and also at an angle of about 45° with the header radius passing through the bases thereof. By passing the hydrocarbon through such a header and attached nozzles a circular motion toward the center of the chamber is provided which improves suspension and withdrawal of the aluminum halide.

This method provides a positive refortification method which is effective regardless of the condition of the catalyst. Refortification by depressuring the complex and dissolving or suspending AlCl₃ in it becomes very difficult if not impossible when the catalyst complex is in poor condition, i. e., having a high viscosity. Usually the only effective means of reducing the viscosity is by refortifying with fresh AlCl₃. (The higher the viscosity the more difficult is refortification by the catalyst complex depressuring method.)

Most often it is desirable to suspend only aluminum halide in the upper portion of the chamber at one time and withdraw the larger portion of this through the withdrawal conduit before suspending any more of the halide. In this manner halide is suspended progressively down the chamber and is withdrawn similarly. The particular advantage of operating in this fashion is that a greater quantity of aluminum halide may be charged to the chamber at greater intervals than would ordinarily be possible if the whole aluminum halide charge was suspended at one time. This is particularly desirable when considerable quantities of aluminum halide-hydrocarbon complex catalysts are being used; however, although it is less advantageous to suspend the whole bed of aluminum halide, it may under specific conditions be the most desirable procedure and I do not exclude this method of operation from my invention.

When placing a fresh chamber of aluminum halide on stream it is first desirable to feed the hydrocarbon in which the halide is to be suspended into the upper portion of the chamber and withdraw same from the top thereof for recycle. In this manner no problem of storage of the hydrocarbon used to bring the aluminum halide into suspension arises.

Several modifications of my invention may be practiced, one of which has already been discussed. Another consists of suspending the whole bed of aluminum halide and then withdrawing portions of the suspension as desired through a venturi with perforations in the side thereof for receiving the suspension. When such a mode of operation is in use hydrocarbon generally similar to that which the halide is suspended is passed upwardly or downwardly through the axial conduit thus sucking suspended halide and suspending hydrocarbon through the perforations in the venturi and carrying same to the desired catalyst chamber. Still another mode of operation is that wherein apparatus of the type described is used except that the axial conduit is absent. All of the aluminum halide is brought in suspension by nonreacting hydrocarbon introduced to the storage chamber through the headers and is withdrawn from the bottom thereof as desired. This method makes use of a valve in the bottom of the chamber for adjusting the flow of suspension and for this reason is usually not as advantageous as the previously discussed modes of operation, mainly because such valves become plugged rather easily with aluminum halide from the suspension.

Refer now to the attached drawings which are of a preferred embodiment of my invention. Figure 1 is in elevation and partly in cross section while Figure 2 is an isometric view. In Figure 1, number 10 is a chamber for storing aluminum halide and from which it may be withdrawn and passed to a catalyst chamber for refortification of an aluminum halide-hydrocarbon complex catalyst. Aluminum halide is charged to chamber 10 through flanged opening 11. After sufficient halide has been placed in the chamber the opening is closed off as by a blind flange. Suspending material which is unreactive with the aluminum halide, which in the case of diisopropyl manufacture may be isobutane used as one of the reactants, is passed as from storage tank 12 via line 13, pump 14 therein and line 16 and pump 17 therein to manifold 18. From this manifold the suspending liquid is passed through lines 19, 21, 22, 23, 24, and 26 into chamber 10. As indicated in the previous discussion of my preferred embodiment the suspending liquid is first introduced at the top of the chamber as through line 19 suspending the catalyst thereabove. When the catalyst is almost completely removed from the top zone suspending liquid is introduced through the next lower line, line 21, for suspending the catalyst thereabove. This is carried out progressively down the chamber until all the aluminum halide has been suspended and withdrawn. The suspending liquid is introduced to the storage chamber through circular headers 27 from which it is passed through nozzles 28 into the stored aluminum halide. The preferred position of nozzles 28 is that of 45° either up or down from the horizontal and 45° with the header radii passing through the base of the nozzles. Thus, when the suspending liquid is passed therethrough a circular motion is provided which aids in suspending the aluminum halide. During startup procedure when the storage chamber is first brought on-stream the suspending liquid is withdrawn from the top of the chamber through line 29 and is passed therethrough to line 31 which leads to the catalyst chamber. In this manner the liquid which has come in contact with the aluminum halide is prevented from contacting pumps and other equipment easily damaged by erosion or plugging. It is within the scope of my invention, however, to recycle the liquid from line 29 to manifold 18 by means not shown for reuse in suspending the catalyst. Thus in either embodiment the aluminum halide is first brought in suspension before removal of any of the halide to catalyst refortification.

The suspended aluminum halide is withdrawn from chamber 10 through axial conduit 32 which is closed at its upper end. Slotted perforations 30 are vertically positioned around this conduit at a plurality of levels for withdrawing the suspension of aluminum halide and suspending material. These perforations may be in shapes other than vertical slots, such as circles or horizontal or angularly positioned slots or ovals. Frusto-conical baffles 33 are positioned around each group of perforations to prevent aluminum halide from entering them when the chamber is charged. The circular headers 27 previously discussed are secured to the outer periphery of chamber 10 as by flanges 34 and J clamps 36. The axial conduit is generally constructed so that it may be readily removed from the storage chamber. This is made possible by flanging same to a short length of conduit 37 secured to the bottom head of the chamber. I bolt 38 is provided in the top of said conduit for ease in hoisting same.

The suspended aluminum halide withdrawn through conduit 32 is carried through conduit 37 to line 39 and is passed therethrough to line 31 and on to a catalyst chamber not shown. Suitable control means are provided for regulating the flow of suspending liquid such as rate of flow control 41.

In Figure 2 portions of the apparatus which are the same as those numbered in Figure 1 will be similarly numbered. This drawing is made isometric to show more clearly the positioning of the circular headers 27, their supports 34 and 36, the perforations 30 in conduit 32, and the protective frusto-conical baffles 33 around said perforations.

Although the process and apparatus of this invention have been described and exemplified in terms of their preferred modifications it is understood that various changes may be made without departing from the spirit and scope of the disclosure and of the claims.

I claim:

1. A process for refortification of an aluminum halide-hydrocarbon complex from a packed upright cylindrical column of solid particulate aluminum halide containing a plurality of vertically disposed contiguous sections which comprises introducing a suspending liquid unreactive with aluminum halide under suspending conditions to the bottom of the top section of said column below the upper level of said particulate aluminum halide through a series of injection zones circumferentially disposed in relation to said column, each being inwardly directed at an angle of about 45° to a radius of said column intersecting each said zone and at an angle of about 45° to the horizontal, and withdrawing liquid and suspended aluminum halide at the liquid level axially of said column so as to cause said suspending liquid to pass obliquely and spirally through said column; when the aluminum halide has been suspended and removed from said top section, suspending and removing the aluminum halide from the next lower section by the procedure utilized in said top section; continuing the suspension and removal of aluminum halide from each progressively lower section of said column until the same has been depleted; and passing the liquid suspension of aluminum halide into contact with an aluminum halide-hydrocarbon complex so as to refortify same.

2. The process of claim 1 in which the aluminum halide is aluminum chloride.

3. The process of claim 2 in which the suspending liquid is a hydrocarbon.

4. The process of claim 1 in which the suspending liquid is isobutane and the halide is aluminum chloride.

JOHN L. GROEBE.

References Cited in the file of this patent

UNITED STATES PATENTS

| Number | Name | Date |
| --- | --- | --- |
| 2,267,412 | Merwin | Dec. 23, 1941 |
| 2,323,830 | McMillan | July 6, 1943 |
| 2,360,700 | McAllister et al. | Oct. 17, 1944 |
| 2,421,326 | Groebe | May 27, 1947 |
| 2,515,138 | Schutze | July 11, 1950 |

FOREIGN PATENTS

| Number | Country | Date |
| --- | --- | --- |
| 536,788 | Great Britain | May 27, 1941 |